US007448301B1

(12) United States Patent
Cronin

(10) Patent No.: US 7,448,301 B1
(45) Date of Patent: Nov. 11, 2008

(54) SNAP RING PLIERS

(76) Inventor: John A. Cronin, 166 E. Paso Fino Way, Queen Creek, AZ (US) 85243

( * ) Notice: Subject to any disclaimer, the term of this patent is extended or adjusted under 35 U.S.C. 154(b) by 0 days.

(21) Appl. No.: 11/743,800

(22) Filed: May 3, 2007

(51) Int. Cl.
*B25B 7/12* (2006.01)
*B25B 25/00* (2006.01)
*B23P 19/04* (2006.01)

(52) U.S. Cl. ............................ 81/302; 81/485; 81/486; 29/229; 7/128

(58) Field of Classification Search .................. 81/302, 81/9.3, 427.5, 485, 486; 29/229; 7/125, 7/128
See application file for complete search history.

(56) References Cited

U.S. PATENT DOCUMENTS 876,963 A * 1/1908 Hoak ............................ 7/130
2,494,963 A * 1/1950 Ray ............................ 81/9.3
2,532,141 A * 11/1950 Barkan et al. ................. 29/229
2,861,833 A * 11/1958 Nierhaus ..................... 81/302
5,542,167 A * 8/1996 Nakamoto ................... 29/229
2005/0188468 A1* 9/2005 Crawford ....................... 7/107

* cited by examiner

*Primary Examiner*—Hadi Shakeri
(74) *Attorney, Agent, or Firm*—Parsons & Goltry; Michael W. Goltry; Robert A. Parsons

(57) ABSTRACT

Snap ring pliers include a first section having a first jaw portion with a first outer end and a first tip projecting outwardly from the first outer end, and a second section having a second jaw portion with a second outer end and a second tip projecting outwardly from the second outer end. The first tip opposes the second tip. A pivot pivotally couples the first section to the second section for movement of the first and second jaw portions between closed and open positions. The first and second tips are joined forming a tongue adapted to be received in a snap ring gap in the closed position of the first and second jaw portions, and the first and second tips are spaced apart and separated by a gap in the open position of the first and second jaw portions.

3 Claims, 9 Drawing Sheets

SNAP RING PLIERS

FIELD OF THE INVENTION

The present invention relates to impact wrenches and, more particularly, to a tool for installing and removing snap rings relative to an impact wrench.

BACKGROUND OF THE INVENTION

An impact wrench is a socket wrench power tool designed to deliver high torque output with minimal exertion by the user by storing energy in a rotating mass or hammer that is delivered suddenly to an output shaft or anvil. A socket is attached to the anvil, and the rotating hammer is accelerated by a motor and then suddenly connected to the anvil creating a high torque impact to the anvil and, in turn, to the socket attached to the anvil. The hammer mechanism is designed such that after delivering the impact the hammer is again allowed to spin freely. With this design, the only reaction force applied to the body of the tool is the motor accelerating the hammer, and thus the operator feels very little torque, even though a very high peak torque is delivered to the socket. Compressed air is the most common power source for impact wrenches, although electric and hydraulic power is also used, with cordless electric impact wrenches becoming more popular.

Various attachment systems are used to attach sockets to the anvils of impact wrenches. Common attachment systems include a spring-loaded pin incorporated in the anvil that snaps into a corresponding hole formed in the socket, or a snap ring which holds the socket by friction or by snapping into indents machined into the socket. A typical snap ring is a severed ring formed of rugged spring steel, which encircles an O-ring located in an annular groove formed in the anvil. A snap ring must be periodically replaced due to damage and wear. Installing and removing a snap ring relative to an anvil is difficult and somewhat time consuming, particularly because there is no tool or device specifically designed for such use. Accordingly, there is a specific need in the art for a specialized tool designed to install and remove a snap ring relative to an anvil of an impact wrench.

SUMMARY OF THE INVENTION

According to the invention, snap ring pliers includes a first section having a first handle portion and an opposed first jaw portion having a first outer end and a first tip projecting outwardly from the first outer end, and a second section having a second handle portion and an opposed second jaw portion having a second outer end and a second tip projecting outwardly from the second outer end opposing the first tip of the first jaw portion. A pivot pivotally couples the first section to the second section for movement between a first position of the first and second sections and a second position of the first and second sections.

The first position of the first and second sections is a closed position of the first and second jaw portions and an open position of the first and second handle portions. The second position of the first and second sections is an open position of the first and second jaw portions and a closed position of the first and second handle portions. An applied bias biases the first and second sections in the first position, which is applied by a spring coupled between the first and second sections.

The first and second tips are joined forming a tongue in the closed position of the first and second jaw portions, in which the tongue is adapted to be received in a snap ring gap. The first and second tips are spaced apart and separated by a gap in the open position of the first and second jaw portions.

A first snap ring engaging surface is formed in the first outer end of the first jaw portion adjacent to the first tip, and a second snap ring engaging surface is formed in the second outer end of the second jaw portion adjacent to the second tip. In a snap ring that is severed forming opposed first and second snap ring ends and a snap ring gap therebetween, the first tip is disposed in the snap ring gap opposing the first snap ring end, the second tip is disposed in the snap ring gap opposing the second snap ring end, the first snap ring end received against the first tip and a portion of the snap ring proximate the first snap ring end received against the first snap ring engaging surface formed in the first outer end of the first jaw portion, and the second snap ring end received against the second tip and a portion of the snap ring proximate the second snap ring end received against the second snap ring engaging surface formed in the second outer end of the second jaw portion.

A file is affixed to the first section between the first handle portion and the first jaw portion, the file projecting outboard of the first section. An elongate, pointed probe is mounted to the second section between the second handle portion and the second jaw portion for pivotal movement between a stored position juxtaposed relative to the second section and a deployed position extending outwardly relative to the second section.

Opposed first and second snap ring engaging notches are formed in the first and second handle portions of the first and second sections, respectively. The first snap ring engaging notch is disposed toward the second snap ring engaging notch in the closed position of the first and second handle portions for together receiving and sizing a snap ring. The first snap ring engaging notch is disposed away from the second snap ring engaging notch in the open position of the first and second handle portions.

Opposed third and fourth snap ring engaging notches are formed in the first and second handle portions of the first and second sections, respectively. The third snap ring engaging notch is disposed toward the fourth snap ring engaging notch in the closed position of the first and second handle portions for together receiving and sizing a snap ring. The third snap ring engaging notch is disposed away from the fourth snap ring engaging notch in the open position of the first and second handle portions. The third snap ring engaging notch is spaced from and larger than the first snap ring engaging notch, and the fourth snap ring engaging notch is spaced from and larger than the second snap ring engaging notch.

BRIEF DESCRIPTION OF THE DRAWINGS

Referring to the drawings.

Figure 1:
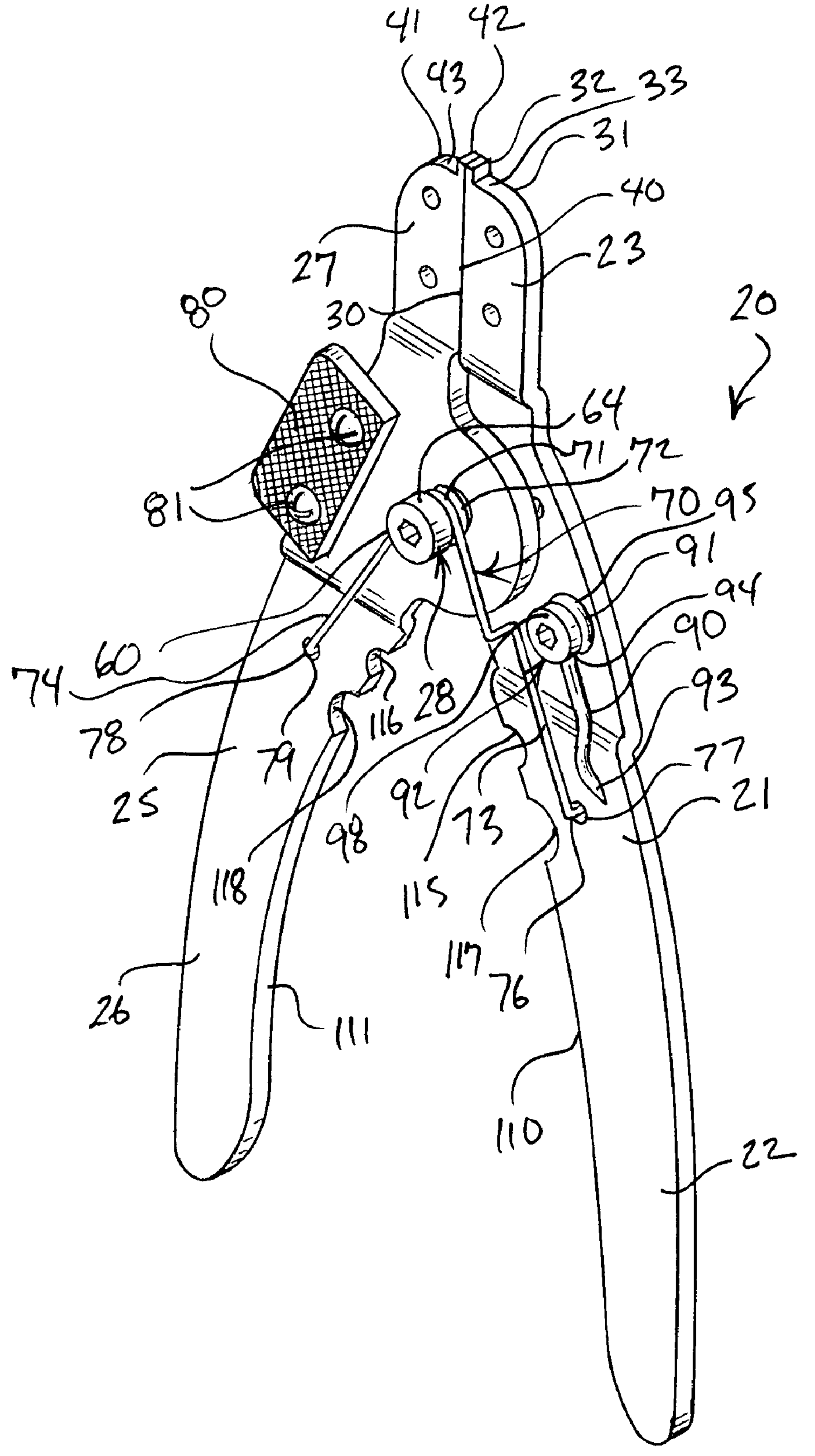
FIG. 1 is a perspective view of snap ring pliers constructed and arranged in accordance with the principle of the invention.
Figure 4:
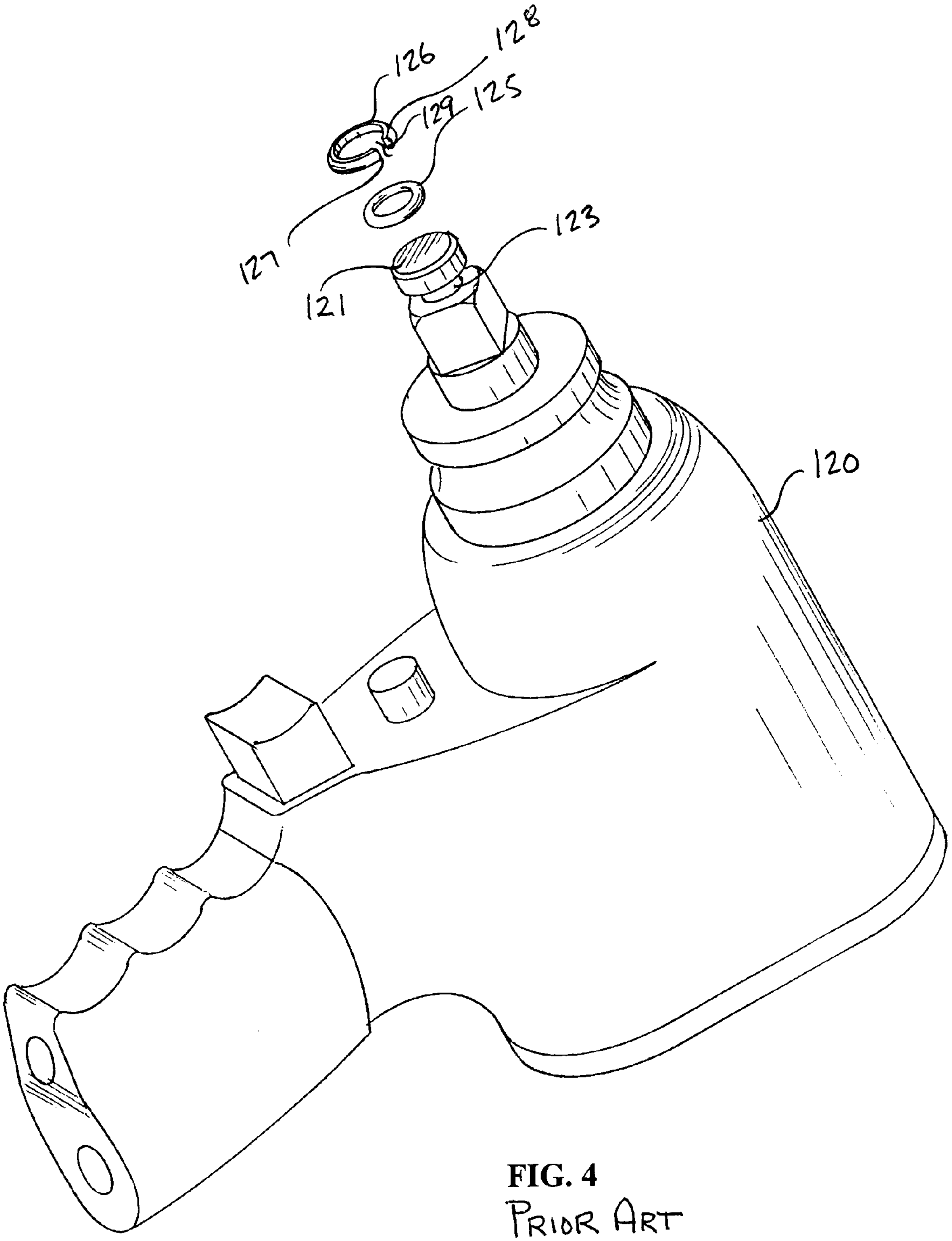
FIG. 4 PRIOR ART
FIG. 4 is a perspective view of a prior art impact wrench including an anvil and an O-ring and a snap ring shown detached relative to the anvil, the snap ring severed forming opposed snap ring ends defining a snap ring gap therebetween.
Figure 6:
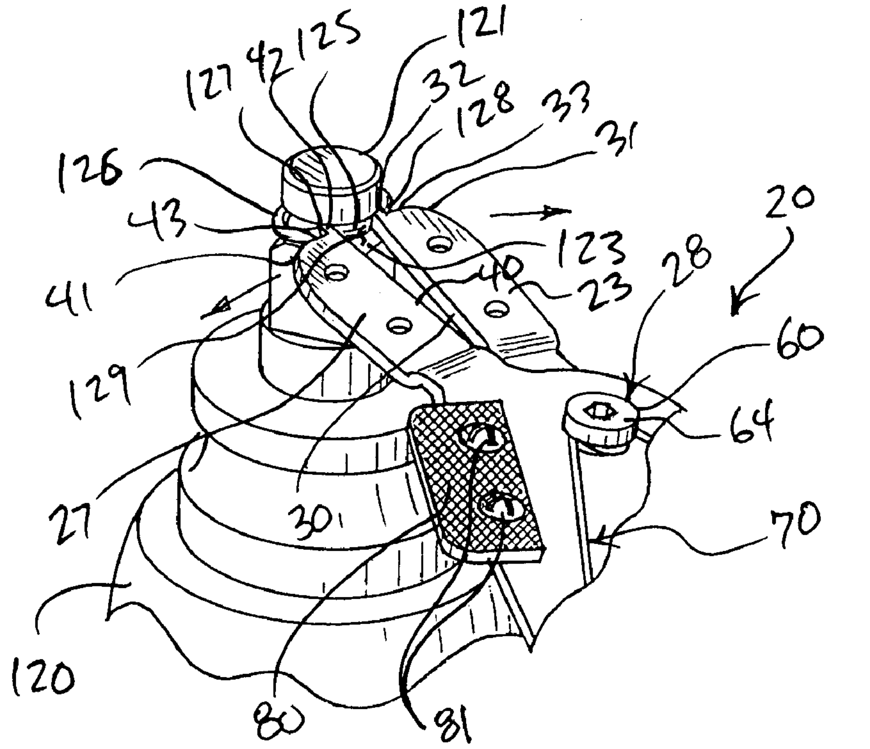
Figure 7:
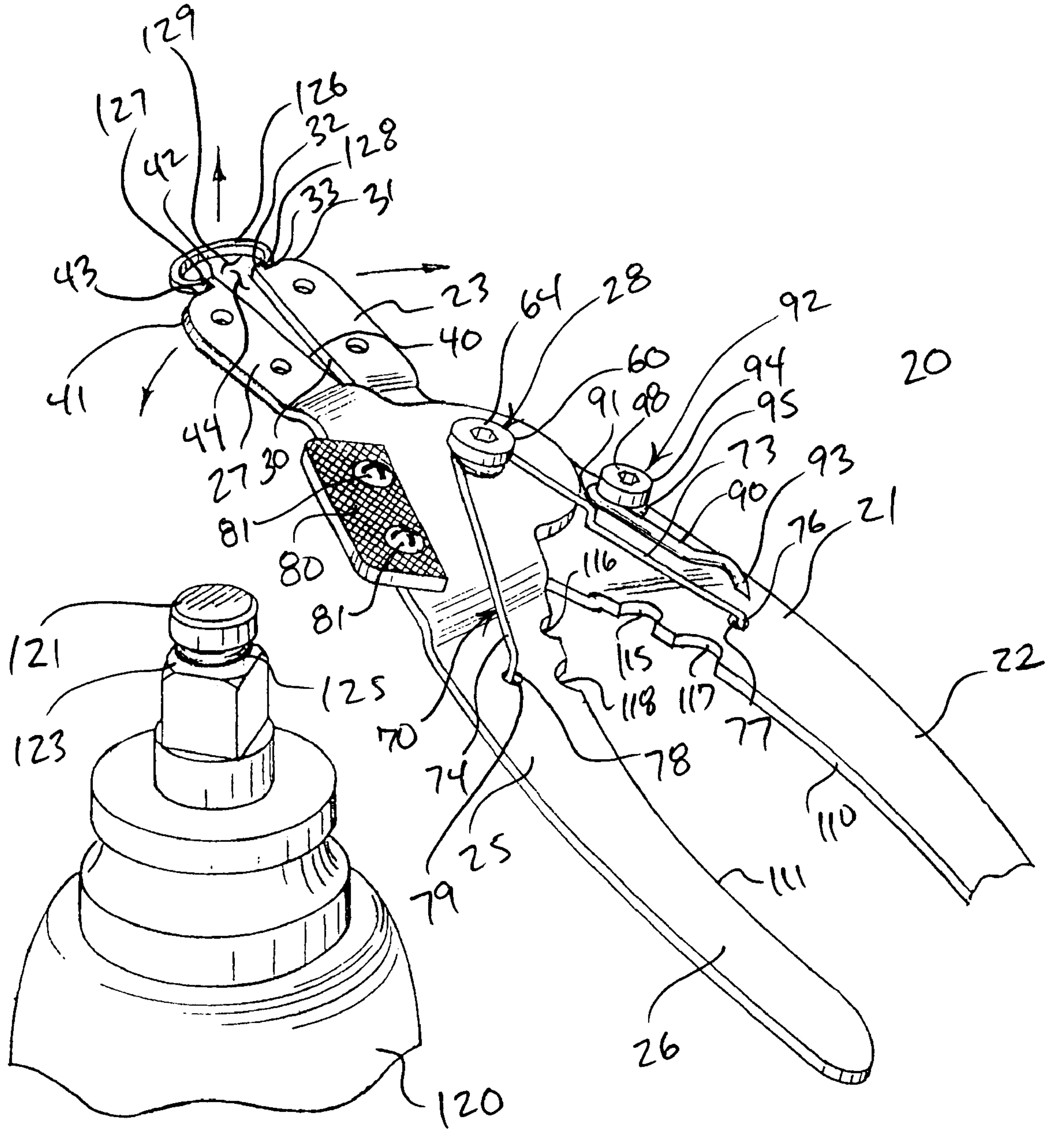
Figure 8:
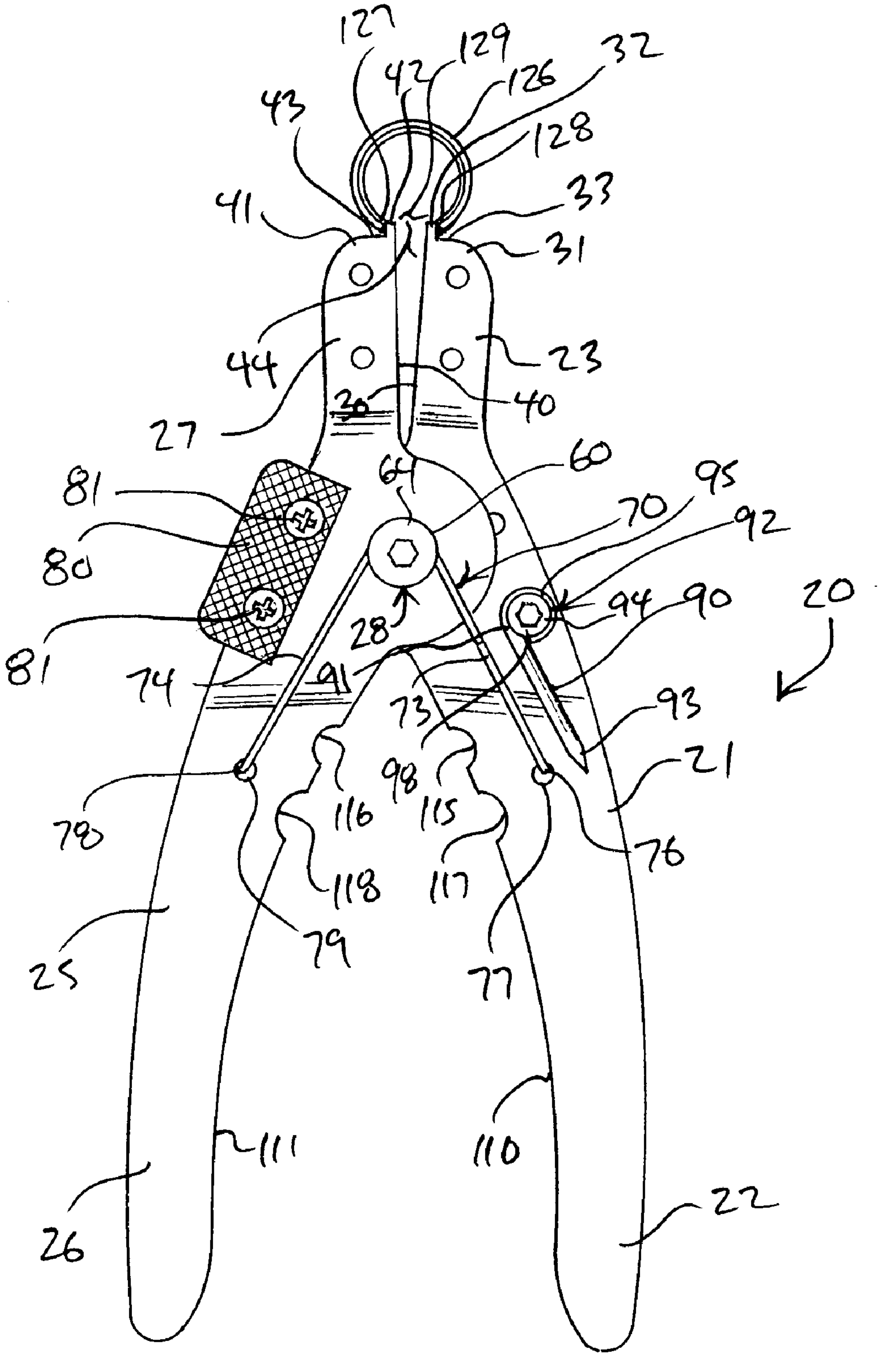
Figure 9:
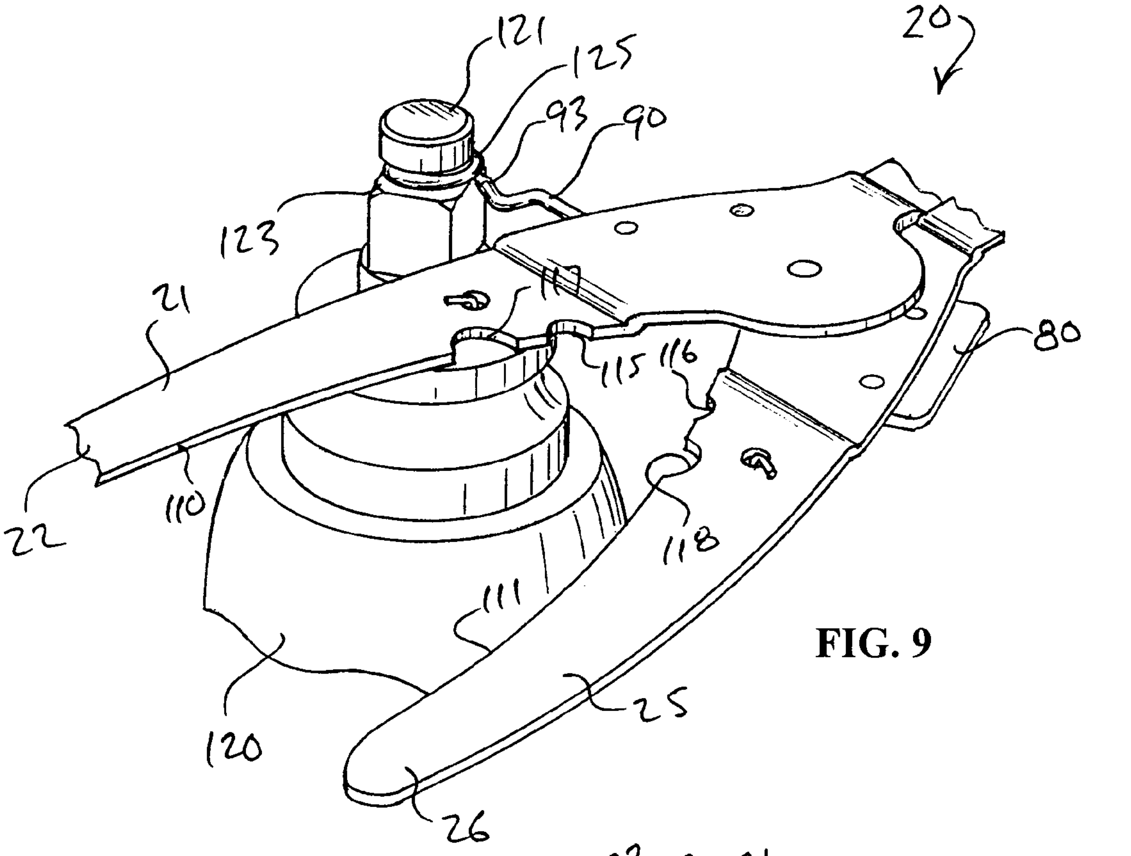
Figure 10:
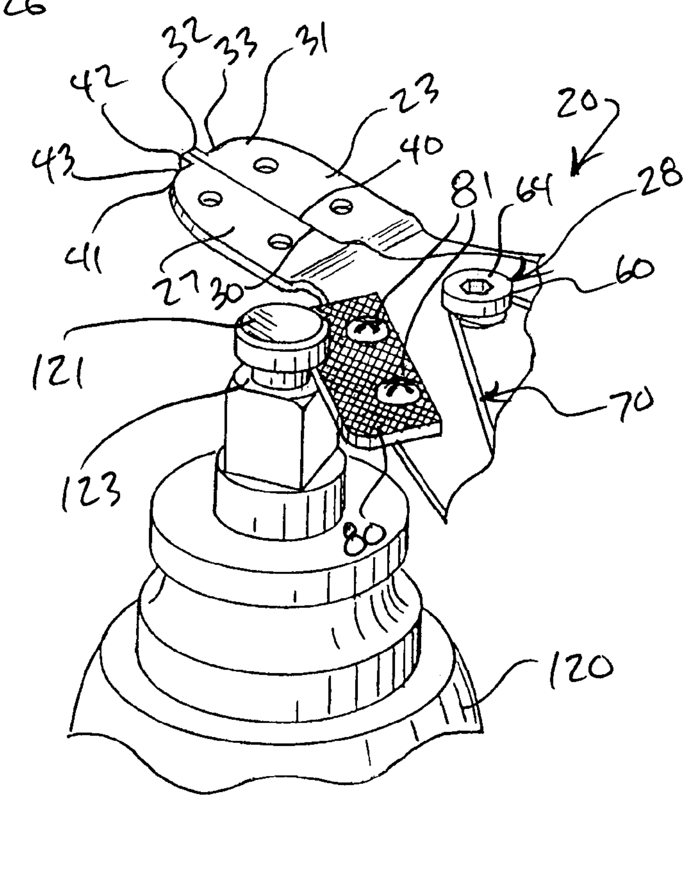
Figure 11:
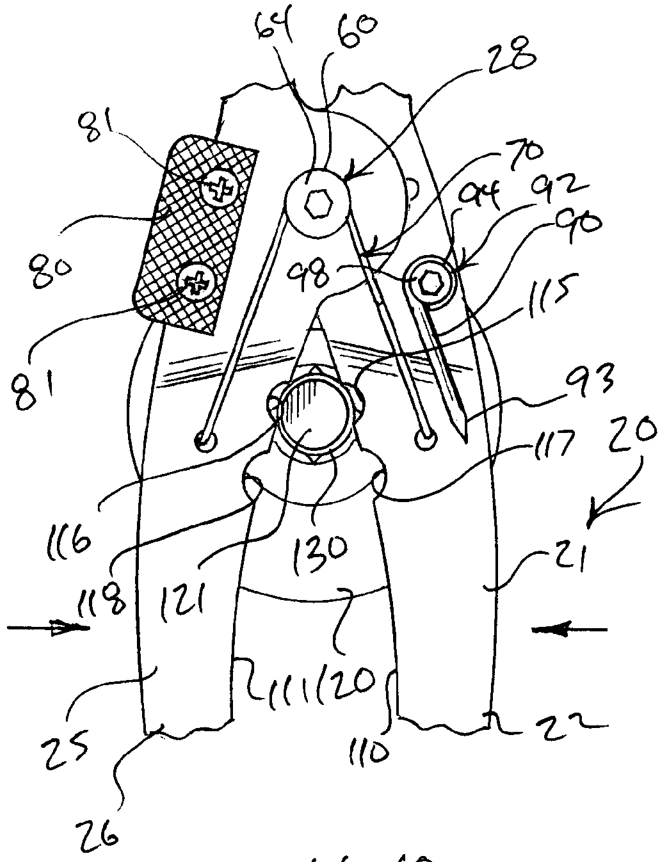
Figure 12:
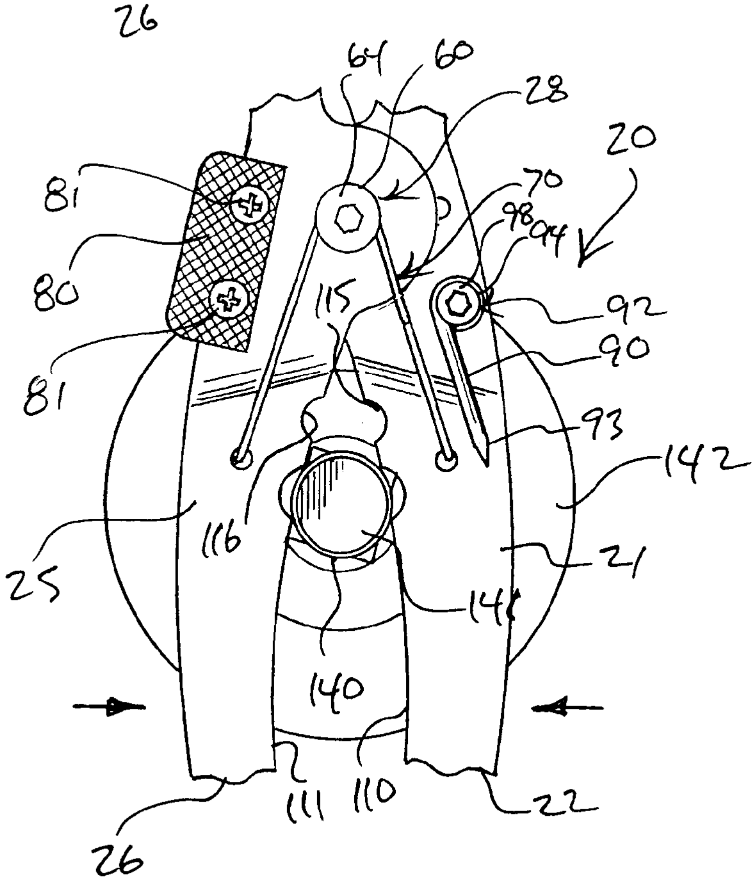

FIG. 6 is a view very similar to that of FIG. 6 illustrating the tips of the pliers inserted in the snap ring gap between the snap ring ends and the pliers disposed in an open position engaging the tips of the pliers against the snap ring ends retaining the snap ring and moving snap ring ends apart opening the snap ring;

FIG. 7 is a view similar to that of FIG. 6 illustrating the snap ring retained by the pliers and removed from the anvil;

FIG. 8 is a top plan view of the pliers of FIG. 7 retaining the snap ring;

FIG. 9 is a fragmented perspective view of the impact wrench of FIG. 4 illustrating the O-ring installed relative to the anvil and an elongate, pointed probe carried by the pliers shown wedged between the O-ring and the anvil;

FIG. 10 is a fragmented perspective view of the impact wrench of FIG. 4 illustrating a file carried by the pliers engaging the anvil;

FIG. 11 is a fragmented top plan view of the pliers of FIG. 1 illustrating a first pair of snap ring engaging notches formed in the pliers engaging a snap ring mounted to the anvil of the impact wrench of FIG. 4; and FIG. 12 is view very similar to that of FIG. 11 illustrating a second pair of snap ring engaging notches formed in the pliers engaging a snap ring mounted to an anvil of an impact wrench.

DETAILED DESCRIPTION OF THE PREFERRED EMBODIMENT

Figure 2:
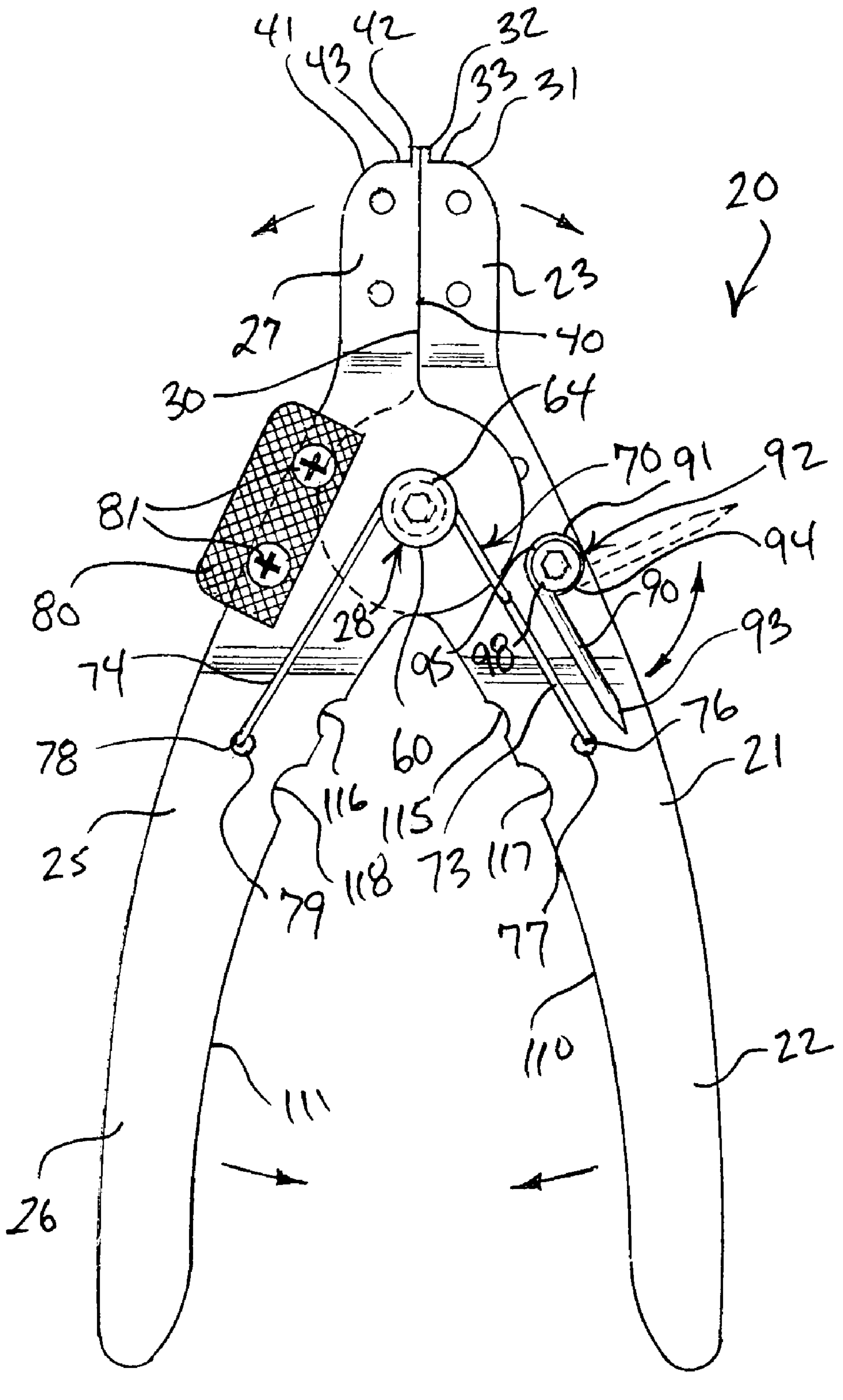
FIG. 2 is a top plan view of the pliers of FIG. 1.
Figure 3:
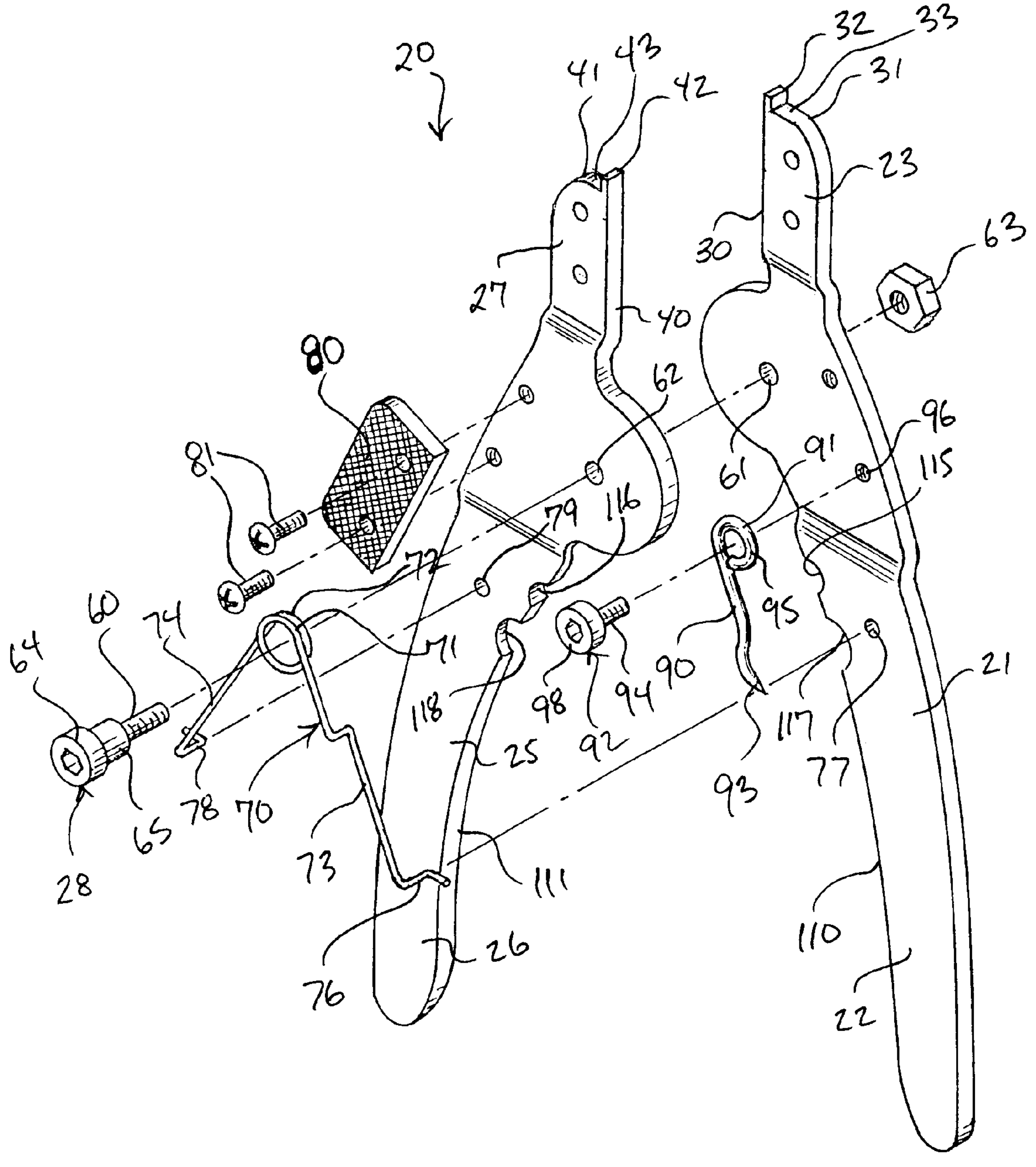
FIG. 3 is an exploded perspective view of the pliers of FIG. 1.

Turning now to the drawings, in which like reference characters indicate corresponding elements throughout the several views, attention is first directed to FIGS. 1-3 in which there is seen a snap ring pliers 20 including a section 21 having a handle portion 22 and an opposed jaw portion 23 and a section 25 having a handle portion 26 and an opposed jaw portion 27, coupled at a pivot 28 between jaw portions 23 and 27 and handle portions 22 and 26. Jaw portion 23 of section 21 includes an inner face 30, an outer end 31 and a tip 32 projecting outwardly from outer end 31. A snap ring engaging surface 33 is formed in outer end 31 of jaw portion 23 adjacent to tip 32. Jaw portion 27 of section 25 has an inner face 40, an outer end 41 and a tip 42 projecting outwardly from outer end 41. A snap ring engaging surface 43 is formed in outer end 41 of jaw portion 27 adjacent to tip 32. Inner faces 30 and 40 confront or otherwise face one another. Sections 21 and 25 are preferably made of steel, aluminum, titanium, or other similarly rigid and rugged material or combination of materials.

Pivot 28 couples sections 21 and 25 for movement between a first position of sections 21 and 25 as illustrated in FIGS. 1 and 2 and a second position of sections 21 and 25 as illustrated in FIGS. 7 and 8. In the first position of sections 21 and 25 as illustrated in FIGS. 1 and 2, jaw portions 23 and 27 are closed or otherwise disposed in a closed position toward one another and handle portions 22 and 26 are open or otherwise disposed in an open position away from one another. In the second position of sections 21 and 25 as illustrated substantially in FIGS. 7 and 8, jaw portions 23 and 27 are open or otherwise disposed in an open position away from one another, and handle portions 22 and 26 are closed or otherwise disposed in a closed position toward one another.

Jaw portions 23 and 27 are substantially coextensive. In the closed position of jaw portions 23 and 27 as illustrated in FIGS. 1 and 2, inner faces 30 and 40 and tips 32 and 42 meet or otherwise join, whereby tips 32 and 42 cooperate forming a tongue projecting outwardly from outer ends 31 and 41, which is adapted and sized to be received by a snap ring gap of a snap ring, further details of which will be discussed in detail later in this specification. In the open position of jaw portions 23 and 27 as illustrated in FIGS. 7 and 8, inner faces 30 and 40 and tips 32 and 42 are spaced apart, in which there is a gap 44 formed between tips 32 and 42.

In the present embodiment as illustrated in FIGS. 1-3, pivot 28 consists of a threaded fastener 60 concurrently received through corresponding holes 61 and 62 formed in sections 21 and 25, respectively, between jaw portions 23 and 27 and handle portions 22 and 26, which is secured by a threaded nut 63 illustrated only in FIG. 3. Threaded fastener 60 is formed with a head 64 received against section 25, and nut 63 is tightened onto threaded fastener 60 and is received on the opposing side of section 21. In place of threaded fastener 60, a rivet or pivot pin or form of pivot joint or pivot coupling can be used, if desired.

A bias is applied to sections 21 and 25 of pliers 20 biasing sections 21 and 25 in the first position as in FIGS. 1 and 2 placing jaw portions 23 and 27 in the closed position thereof and handle portions 22 and 26 in the open position thereof. The described bias is applied by a spring coupled between sections 21 and 25, and which acts on sections 21 and 25 biasing sections in the first position. In the present embodiment, the spring providing the applied bias is a tension spring 70 consisting of a wire formed into coils 71 encircling a constricted neck 65 formed in head 64 of threaded fastener 60 as illustrated in FIG. 3. Coils 71 encircle neck 65 and are captured between section 25 and head 64. In this specific embodiment, tension spring 70 has two active coils 71 and 72 that lead to tag ends 73 and 74, respectively. More active coils may be used, if desired. Tag end 73 is secured to section 21, and tag end 74 is secured to section 25. In the present embodiment as best illustrated in FIGS. 1-3, tag end 73 is formed with a pin or key 76 received by a corresponding hole or keyway 77 formed in section 21 between pivot 28 and handle portion 22, and tag end 74 is formed with a pin or key 78 received by a corresponding hole or keyway 79 formed in section 25 between pivot 28 and handle portion 26.

Tension spring 70 is fashioned of spring steel, a nickel-based spring alloy, or other material or combination of materials having a substantially constant moduli of elasticity as is typical with tension springs. Tension spring 70 applies a forcible impulse against sections 21 and 25 at tag ends 73 and 74 and winds relative to pivot 28 in response to movement of sections 21 and 25 from the first position to the second position, and unwinds relative to pivot 28 in response to movement of sections 21 and 25 from the first position to the second position. Tension spring 70 is biased to unwind, thereby biasing sections 21 and 25 in the first position as illustrated in FIGS. 1 and 2.

Spring 70 coupled to sections 21 and 25 providing the bias as disclosed herein is preferred as it is simple in construction, easy to install, and inexpensive. Although one spring 70 is utilized in connection with pliers 20, more can be used, if desired. Those having regard for the art will readily appreciate that any suitable form and number of spring may be coupled to sections 21 and 25 for providing the bias to sections 21 and 25 as disclosed herein without departing from the invention. In the present embodiment, spring 70 provides an outward pushing force against sections 21 and 25 for providing the applied bias. The bias applied to sections 21 and 25 as herein described may be supplied by a spring coupled between sections 21 and 25 that is adapted to apply a pulling force, if desired.

With continuing reference to FIGS. 1-3, pliers 20 is fashioned with a file 80 and a probe 90. File 80 is a relatively small affixed to pliers 20, and is a tool of hardened steel with cutting ridges for forming or smoothing surfaces especially of metal. File 80 is affixed to section 25 adjacent to pivot 28 between jaw portion 27 and handle portion 26. File 80 is affixed to section 25 with threaded fasteners 81, although rivets, nut-and-bolt assemblies, welding, or the like may be used to rigidly affix file 80 to section 25. File 80 is affixed to section 25 such that it projects projecting outboard of, or otherwise outwardly relative to, the outer marginal edge of section 25 away from pivot 28.

Probe 90 consists of an elongate rigid body having an inner end 91 mounted to section 21 with a pivot 92 between jaw portion 23 and handle portion 22 adjacent to pivot 28, and an opposed outer end 93, which is pointed. Probe 90 pivots at pivot 92, and is thus mounted to section 21 for pivotal movement, between a stored position juxtaposed relative to section 21 as illustrated in FIGS. 1 and 2, and a deployed position extending outwardly relative to section 21 as illustrated in dotted outline in FIG. 2. In the deployed position of probe 90, pointed outer end 93 is directed outwardly away from section 21.

In the present embodiment as best illustrated in FIG. 3, pivot 92 consists of a threaded fastener 94 concurrently received through a ring 95 formed in inner end 91 of probe 90 and a corresponding threaded hole 96 formed in section adjacent to pivot 28 between jaw portion 23 and handle portion 22. Threaded fastener 94 is formed with a head 98 and is tightened securing ring 95 between head 98 and section 21. In place of threaded fastener 94, a rivet or pivot pin or form of pivot joint or pivot coupling can be used, if desired.

Referencing FIGS. 1-3, sections 21 and 25 define inwardly directed edges 110 and 111, respectively, which face inwardly toward one another as illustrated. Edge 110 extends from adjacent to pivot point 28 to and along handle portion 22, and edge 111 extends from adjacent to pivot point 28 to and along handle portion 26. Opposed snap ring engaging notches 115 and 116 are formed in edges 110 and 111, respectively, between pivot point 28 and handle portions 22 and 26. Snap ring engaging notches 115 and 116 are substantially equal in size. Opposed snap ring engaging notches 117 and 118 are also formed in edges 110 and 111, respectively between notches 115 and 116 and handle portions 22 and 26. Snap ring engaging notches 117 and 118 are substantially equal in size. Snap ring engaging notch 117 is spaced from snap ring engaging notch 115, and is larger than each of snap ring engaging notches 115 and 116. Snap ring engaging notch 118 is spaced from snap ring engaging notch 116, and is larger than each of snap ring engaging notches 115 and 116. Snap ring engaging notch 115 is disposed toward snap ring engaging notch 116 in the closed position of handle portions 22 and 26 as substantially illustrated in FIG. 11 for together receiving and sizing a snap ring, and snap ring engaging notch 115 is disposed away from snap ring engaging notch 116 in the open position of handle portions 22 and 26 as substantially illustrated in FIGS. 1 and 2.

Figure 5:
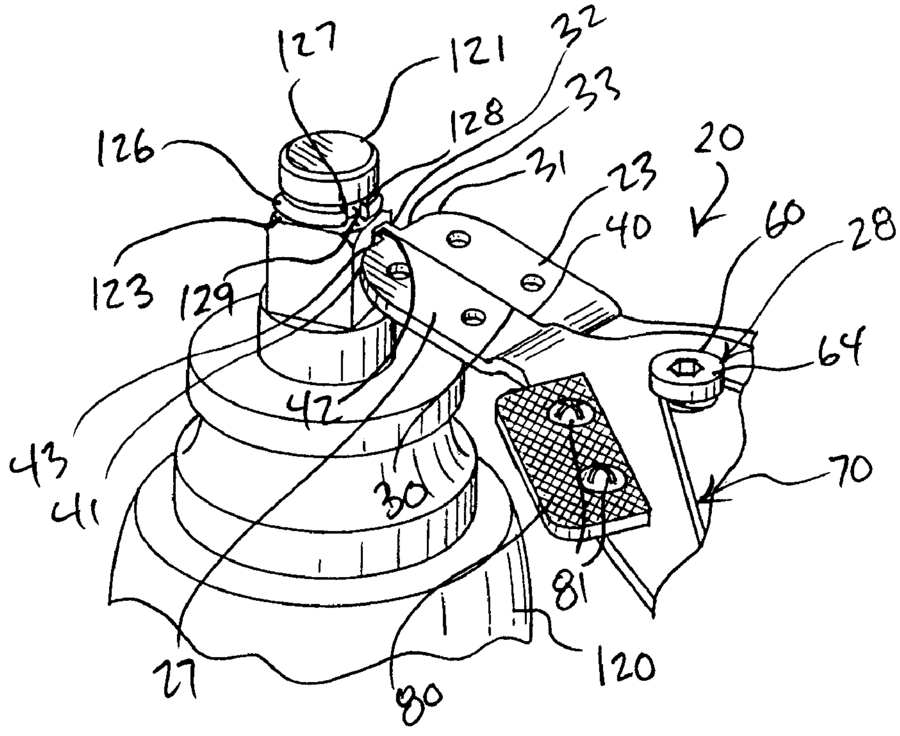
FIG. 5 is a fragmented perspective view of the impact wrench of FIG. 4 illustrating the O-ring and the snap ring installed relative to the anvil and tips of the pliers of FIG. 1 opposing the snap ring gap and shown as they would appear joined forming a tongue in a closed position of the pliers.

Pliers 20 is specifically constructed and arranged for use in removing and installing snap rings relative to the anvil of an impact wrench, such as the prior art impact wrench illustrated in FIG. 4 and denoted at 120, which includes an anvil 121 operatively coupled to an output shaft that is, in turn, operatively coupled to a rotating mass or hammer of impact wrench 120. Anvil 121 is formed with a snap ring groove 123, and is operatively coupled to the output shaft of impact wrench 120 in a conventional and well-known manner. In FIG. 4 also illustrated are a prior art rubber or elastomeric O-ring 125 and a prior art snap ring 126 fashioned of rugged spring steel. Snap ring 126 is severed forming opposed snap ring ends 127 and 128 separated by a gap 129. To install snap ring 126 relative to anvil 121 of impact wrench 120, O-ring 125 is forced over anvil 121 into groove 123. Snap ring 126 is then, in turn, forced over anvil 121 to encircle O-ring 125 completing the installation of O-ring 125 and snap ring 126 relative to anvil 121 as illustrated in FIG. 5. Snap ring 126 may be forced open by moving apart snap ring ends 127 and 128 to enlarged gap 129 allow snap ring 126 to be received over anvil 121 and onto O-ring 125 located in groove 123. After locating snap ring 126 to encircle O-ring 125, an external force is normally applied to snap ring 126 to constrict snap ring 126 about O-ring 125 and thus bring snap ring ends 127 and 128 together to constrict gap 129. After installation of snap ring 126 according to the prior art, gap 129 between snap ring ends 127 and 128 is constricted but yet is maintained. A socket installed over anvil 121 engages and receives snap ring 126, which retains the socket relative to anvil 121 after which impact wrench 120 may be put to use in the normal manner. After an extended period of use, snap ring 126, and often O-ring 125 as well, will normally become damaged and require replacement, which may be carried out with the use of pliers 20.

To remove snap ring 126 and O-ring 125 from anvil 121 of impact wrench 120 as illustrated in FIG. 5, pliers 20 is taken up and wielded by hand and in the first position of sections 21 and 25 such that jaw portions 23 and 27 are in the closed position as illustrated in FIG. 5 and the tongue formed by the joining of tips 32 and 42 is inserted in gap 129. When the tongue formed by tips 32 and 42 in the closed position of jaw portions 23 and 27 is inserted in gap 129, tip 32 opposes and confronts snap ring end 128 of snap ring 126, and tip 42 opposes and confronts snap ring end 127 of snap ring 126. Tips 32 and 42 are relatively small and low profile, which ensures that the tongue formed by the joined tips 32 and 42 in the closed position of jaw portions 23 and 27 is capable of being received in gap 129 between snap ring ends 127 and 128 of snap ring 126 installed relative to anvil 121. When the tongue formed by the joined tips 32 and 42 in the closed position of jaw portions 23 and 27 is inserted into gap 129 between snap ring ends 127 and 128, snap ring end 127 is received against tip 42 and a portion of snap ring 126 proximate snap ring end 127 is received against snap ring engaging surface 43 preventing tip 42 from impinging against O-ring 125 so as do damage O-ring 125, and snap ring end 128 is received against tip 32 and a portion of snap ring 126 proximate snap ring end 128 is received against snap ring engaging surface 33 thereby preventing tip 32 from impinging against O-ring 125 so as do damage O-ring 125.

To remove snap ring 126 with pliers 20 at this point, a forcible impulse is applied to handle portions 22 and 26 sufficient to overcome the bias applied by spring 70 moving sections 21 and 25 into the second position opening jaw portions 23 and 27 and closing handle portions 22 and 26. As jaw portions 23 and 27 are driven open from the closed position by squeezing handle portions 22 and 26 together, tips 32 and 42 are, in turn, driven open or apart thereby moving tips 32 and 42 into frictional engagement with snap ring ends 128 and 127, respectively, and driving snap ring ends 127 and 128 apart widening gap 129 sufficiently as illustrated in FIG. 6 to allow snap ring 126 to be passed over anvil 121 of anvil 121. When snap ring ends 127 and 128 are frictionally engaged by tips 42 and 32, respectively, and driven part by opening jaw portions 23 and 27 to widen gap 129, the force applied by tips 42 and 32 against snap ring ends 127 and 128 frictionally engages and secures snap ring 126 retaining snap ring 126 to tips 32 and 42 of pliers 20, which allows snap ring 126 to then be moved over anvil 121 and away from anvil 121 as illustrated in FIG. 7. By maintaining the force against handle portions 22 and 26 of pliers sufficient to maintain jaw portions 23 and 27 open as illustrated in FIGS. 7 and 8, snap ring 126 will remain frictionally retained to tips 32 and 42 of pliers 20. To remove snap ring 126 from tips 32 and 42, snap ring 126 may simply be taken up by hand and forcibly pulled away from tips 32 and 42, or the force applied to handle portions 22 and 26 maintaining jaw portions 23 and 27 open may simply be released allowing the bias applied to sections 21 and 25 by spring 70 to bias jaw portions 23 and 27 closed disengaging tips 32 and 42 from snap ring ends 128 and 127, respectively, allowing snap ring 125 to simply fall away from tips 32 and 42.

After removing snap ring 126, O-ring 125 may then be removed. To remove O-ring 125 with pliers 20 as illustrated in FIG. 9, probe 90 is pivoted from its stored position to its deployed position as in FIG. 9, and pliers 20 is taken up by hand maneuvering the pointed outer end 93 of probe 90 underneath O-ring 125 between anvil 121 and O-ring 125. By maneuvering pliers 20, pointed outer end 93 of probe 90 is used to wedge and pry O-ring 125 free of groove 123 and of anvil 121. After O-ring 125 is wedged free of groove 123 and anvil 121, probe 90 may be pivoted from its deployed position back to its stored position as illustrated in FIGS. 1 and 2 until use of probe 90 is again required.

After removing O-ring 125, it may be necessary to clean anvil 121 and remove surface burrs or dings or irregularities formed in anvil 121, including groove 123, caused by normal use of impact wrench 120. To clean and remove surface burrs or dings or irregularities formed in anvil 121, and particularly in anvil 121 of anvil 121, pliers 20 may be taken up by hand maneuvering file 80 against anvil 121, including groove 123, as shown in FIG. 10. Through the application of a back-and-forth motion applied to pliers 20, anvil 121 may be acted upon by file 80 to file away any dirt and debris from anvil 121, including groove 123, and for filing away any unwanted burrs and dings and other surface irregularities formed in anvil 121, including groove 123.

After cleaning anvil 121, a new or replacement O-ring is installed in groove 123 and a new or replacement snap ring is installed over the new or replacement O-ring. If desired, the process used to remove the old or spent snap ring with pliers 20 may simply be reversed to install a new or replacement snap ring. As matter of example, the new snap ring is place on a work surface and tips 32 and 42 of pliers 20 are inserted in to the gap between the snap ring ends of the new snap ring. Handle portions 22 and 26 are squeezed, such as by hand, opening jaw portions 22 and 27 opening the new snap ring through the action of tips 32 and 42 against the snap ring ends of the new snap ring and frictionally retaining the new snap ring to pliers 20. By maneuvering pliers 20, the new snap ring is held over anvil 121 and is then lowered over anvil 121 about the O-ring disposed in the anvil groove 123 and then released allowing the new or replacement snap ring to snap in place over the O-ring.

As mentioned previously, after locating a snap ring to encircle an O-ring installed on an anvil, an external force is normally applied to the snap ring to constrict the snap ring against the O-ring. To carry out this process with pliers 20, pliers 20 is taken up in the first position of sections 21 and 25 and is held locating the new snap ring between edges 110 and 111 of sections 21 and 25 between pivot point 28 and handle portions 22 and 26. In one example, the new snap ring is registered between notches 115 and 116 and sections 21 and 25 are moved into the second position closing handle portions 22 and 26 capturing the new snap ring between notches 115 and 117, at which handle portions 22 and 26 are squeezed constricting the new snap ring about the O-ring to the proper working size. As a matter of example, FIG. 11 illustrates a replacement snap ring 130 mounted to anvil 121 of impact wrench 120 and located between edges 110 and 111 of sections 21 and 25 and handle portions 22 and 26 squeezed together in the closed position of handle portions 22 and 26 overcoming the bias applied by spring 70 capturing and seizing snap ring 130 between notches 115 and 117 constricting and sizing snap ring 130 relative to anvil 121 of impact wrench 120.

As previously mentioned, notches 117 and 118 are each larger that each of notches 115 and 116, and are utilized in the same manner as notches 115 and 116 but to size larger sized snap rings utilized with correspondingly larger sized anvils. As a matter of example, FIG. 11 illustrates a snap ring 140 mounted to an anvil 141 of an impact wrench 142 and located between edges 110 and 111 of sections 21 and 25 and handle portions 22 and 26 squeezed together in the closed position of handle portions 22 and 26 overcoming the bias applied by spring 70 capturing and seizing snap ring 140 between notches 115 and 117 constricting and sizing snap ring 140 relative to anvil 141 of impact wrench 142. As seen in FIG. 12, snap ring 140 and anvil 141 are each larger in size than snap ring 130 and anvil 121 illustrated in FIG. 11. Although two pairs of snap ring engaging notches are incorporated with pliers 20, one or more additional pairs may be employed, if desired for flexibility in sizing differently sized snap rings with differently sized anvils.

Those having regard for the relevant art will readily appreciate that an exemplary snap ring pliers 20 is disclosed. Pliers 20 is easy and safe to use, easy to construct, and provides for the efficient and convenient removal and installation of a snap ring relative to an anvil of an impact wrench. Pliers 20 is inexpensive and no specialized skill is required to use pliers 20 and hastens and simplifies the normally tedious and time-consuming process of removing and installing snap rings.

The invention has been described above with reference to a preferred embodiment. However, those skilled in the art will recognize that changes and modifications may be made to the embodiment without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Snap ring pliers comprising:

a first section defining a first upper side, the first section having a first handle portion and an opposed first jaw portion having a first outer end and a first tip projecting outwardly from the first outer end;

a second section defining a second upper side, the second section having a second handle portion and an opposed second jaw portion having a second outer end and a second tip projecting outwardly from the second outer end opposing the first tip of the first jaw portion;

a file affixed to the first section with fasteners on said first upper side between the first handle portion and the first jaw portion, the file projecting outboard of the first section;

an elongate, pointed probe mounted to the second section with a first pivot on said second upper side between the second handle portion and the second jaw portion for pivotal movement between a stored position juxtaposed relative to the second section and a deployed position extending outwardly relative to the second section;

a second pivot perpendicular to the upper sides pivotally coupling the first section to the second section for movement between a first position of the first and second sections and a second position of the first and second sections;

the first position of the first and second sections comprising a closed position of the first and second jaw portions and an open position of the first and second handle portions;

the second position of the first and second sections comprising an open position of the first and second jaw portions and a closed position of the first and second handle portions;

the first and second tips joined forming a tongue in the closed position of the first and second jaw portions, the tongue adapted to be received in a snap ring gap;

the first and second tips spaced apart and separated by a gap in the open position of the first and second jaw portions;

means acting on the first and second sections biasing the first and second sections in the first position;

opposed first and second snap ring engaging notches formed in the first and second handle portions of the first and second sections, respectively;

the first snap ring engaging notch disposed toward the second snap ring engaging notch in the closed position of the first and second handle portions for together receiving and sizing a snap ring;

the first snap ring engaging notch disposed away from the second snap ring engaging notch in the open position of the first and second handle portions;

opposed third and fourth snap ring engaging notches formed in the first and second handle portions of the first and second sections, respectively;

the third snap ring engaging notch disposed toward the fourth snap ring engaging notch in the closed position of the first and second handle portions for together receiving and sizing a snap ring;

the third snap ring engaging notch disposed away from the fourth snap ring engaging notch in the open position of the first and second handle portions;

the third snap ring engaging notch spaced from and larger than the first snap ring engaging notch; and the fourth snap ring engaging notch spaced from and larger than the second snap ring engaging notch.

2. The snap ring pliers according to claim 1, wherein the means acting on the first and second sections biasing the first and second sections in the first position comprises a spring coupled between the first and second sections.

3. The snap ring pliers according to claim 1, further comprising:

a first snap ring engaging surface formed in the first outer end of the first jaw portion adjacent to the first tip; and a second snap ring engaging surface formed in the second outer end of the second jaw portion adjacent to the second tip.

* * * * *